United States Patent [19]

Tsuchiya

[11] Patent Number: 4,504,877
[45] Date of Patent: Mar. 12, 1985

[54] AUTO-REVERSE TYPE CASSETTE TAPE PLAYER

[75] Inventor: Tatsuhiko Tsuchiya, Kakuda, Japan

[73] Assignee: Alps Electric Co., Ltd., Tokyo, Japan

[21] Appl. No.: 349,752

[22] Filed: Feb. 18, 1982

[30] Foreign Application Priority Data

Feb. 18, 1981 [JP] Japan .................. 56-21843[U]

[51] Int. Cl.³ ............................................. G11B 5/008
[52] U.S. Cl. ...................................... 360/96.2; 360/105
[58] Field of Search ..................... 360/105, 74.1, 96.2

[56] References Cited

U.S. PATENT DOCUMENTS 4,159,492  6/1979  Ban et al. ........................... 360/74.1
4,318,138  3/1982  Osanai ................................. 360/105
4,346,415  8/1982  Tomabechi et al. ............... 360/96.2
4,430,680  2/1984  Yamaguchi et al. .............. 360/96.2

Primary Examiner—Bernard Konick
Assistant Examiner—Paul Stefanski
Attorney, Agent, or Firm—Guy W. Shoup; Gerard F. Dunne

[57] ABSTRACT

An auto-reverse type cassette tape player having a head base rockably mounted on the front side of a bed and carrying a pair of magnetic heads, so that the magnetic heads are switched in a seesaw-like manner as the tape running direction is switched as a result of a switching between two pinch rollers which cooperate with corresponding capstan shafts.

12 Claims, 10 Drawing Figures

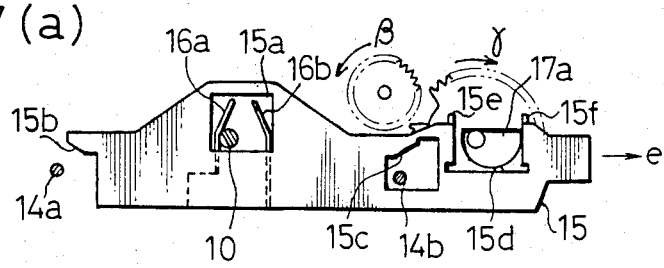
Fig. 7(a)
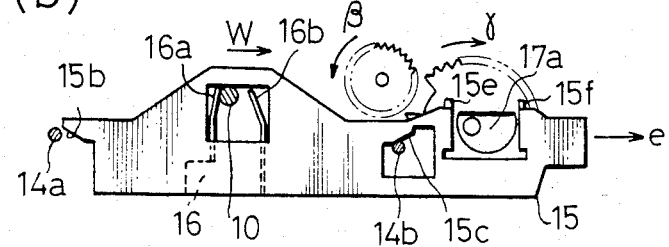
Fig. 7(b)
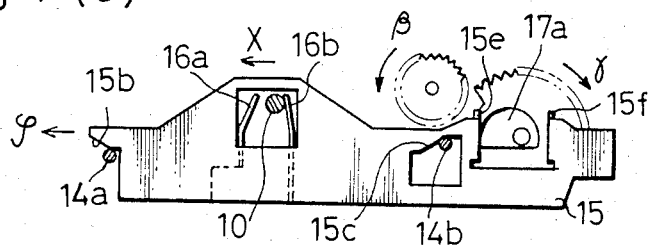
Fig. 7(c)
Fig. 8
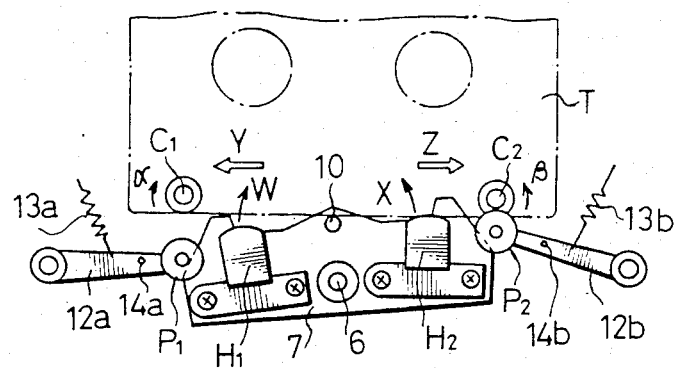

AUTO-REVERSE TYPE CASSETTE TAPE PLAYER

BACKGROUND OF THE INVENTION

The present invention relates to an auto-reverse type cassette player.

In general, the tape of a cassette tape player runs in the same direction in the play back and recording modes and recording, and a troublesome manual work for withdrawing and inverting the cassette tape is often necessary for switching the recording track of the tape.

Recently, a so-called auto-reverse type cassette tape players have been proposed in which the tape running direction is switched between the play back and recording modes automatically without necessitating removal of the cassette tape. In this auto-reverse type cassette tape player, it is necessary to effect the switching of the track for each tape running direction. To cope with this demand, the known auto-reverse type cassette tape players typically incorporated a single magnetic head for 4 (four) tracks. In micro-cassette tape players using micro-cassette tapes, however, it is extremely difficult from the technical point of view to adapt the magnetic head for 4 tracks, because the magnetic head itself has an extremely reduced size. Even if the magnetic head is adapted for use in combination with 4 track tapes, such a magnetic head will be unacceptably expensive.

SUMMARY OF THE INVENTION

Accordingly, an object of the invention is to provide an auto-reverse type cassette tape player in which the switching of the tracks is effected by means of two less-expensive magnetic heads each being adapted for 2 tracks, so that the construction of the player as a whole is simplified and the cost of production is much reduced.

Another object of the invention is to provide an auto-reverse type cassette tape player which can switch the head with reduced torque.

Still another object of the invention is to provide an auto-reverse type cassette tape player which can effect the switching of magnetic heads and pinch rollers by the same mechanism.

A further object of the invention is to provide an auto-reverse type cassette tape player in which the magnetic head can be brought into contact with the magnetic tape without fail.

To these ends, according to the invention, there is provided an auto-reverse type cassette tape player having a pair of 2-track magnetic heads mounted on a head base rockable in a manner like a seesaw by the operation of a slide plate mounted in a bed, with the slide plate being adapted also to alternatingly shift a pair of pinch rollers.

The above and other objects, as well as advantageous features of the invention will become clear from the following description of the preferred embodiments taken in conjunction with the accompanying drawings.

BRIEF DESCRIPTION OF THE DRAWINGS

FIGS. 7a, 7b and 7c are illustration of operation of a slide plate; and

FIG. 8 is an illustration of operation of a head base and pinch rollers.

DESCRIPTION OF THE PREFERRED EMBODIMENT

A preferred embodiment of the invention will be described hereinunder with reference to the accompanying drawings.

A bed 1 is adapted to be loaded at its front side with a micro-cassette tape T. A pair of reel shafts $R_1$, $R_2$ projected from the front side of the bed 1 is adapted to be driven by a power mechanism (not shown) disposed at the rear side of the bed 1 for forwarding and rewinding, as well as normal tape running for play back and recording. The direction of rotation of the reel shafts $R_1$ and $R_2$ is changed between the play back mode and recording mode to reverse the running direction of the tape.

Figure 3:
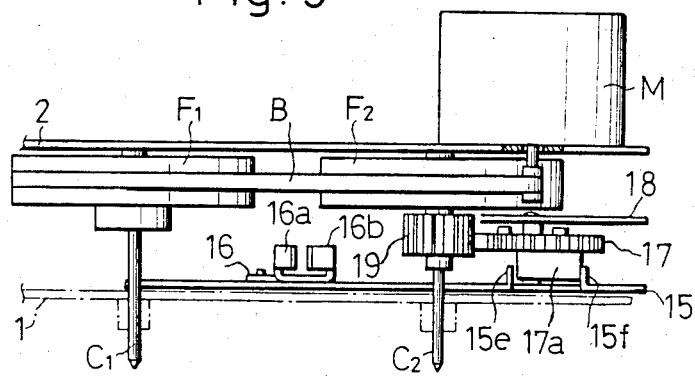
FIG. 3 is a plan view of an auto-reverse type cassette tape player in accordance with the embodiment of the invention.
Figure 4:
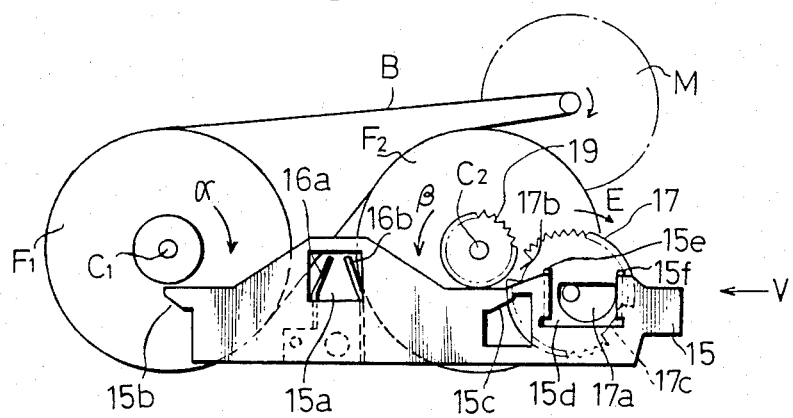
FIG. 4 is a front elevational view of the cassette tape player shown in FIG. 1 with a bed removed therefrom.

A pair of capstan shafts $C_1 C_2$ are located beneath the reel shafts $R_1$ and $R_2$. The capstan shafts $C_1$ and $C_2$ are adapted to cooperate with a pair of pinch rollers $P_1$ and $P_2$ to pinch the tape therebetween to feed the tape at a constant speed during play back and recording. As will be understood from FIG. 3, the capstan shafts $C_1$ and $C_2$ are rotatably inserted into the bed 1 and are integrated with fly-wheels $F_1$, $F_2$ which are disposed behind the bed 1, to rotate together with these fly-wheels. The fly-wheels $F_1$ and $F_2$ are rotatably carried by a mounting base 2 disposed behind the bed 1. The mounting base 2 also carries a motor M having a shaft drivingly connected to the fly-wheels $F_1$, $F_2$ *so that the fly-wheels are driven in opposite directions by the motor M, as will be understood from FIG. 4.*

Figure 1:
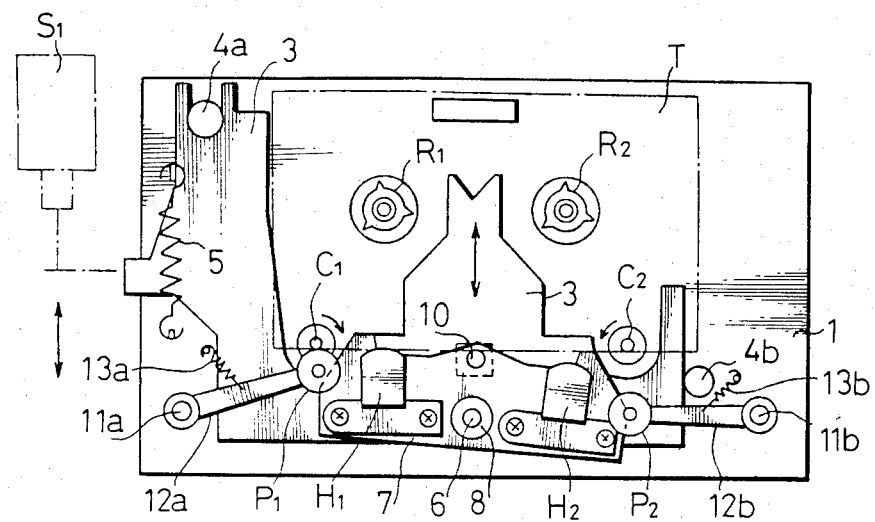
FIG. 1 is a front elevational view of an auto-reverse type cassette tape player in accordance with an embodiment of the invention.

A slide base 3 disposed at the front side of the bed 1 is secured slidably to the latter by means of guide pins 4a, 4b (See FIG. 1) so as to be able to slide in the direction of the arrow. As schematically shown in FIG. 1, the slide base 3 is adapted to be lifted upwardly by a solenoid $S_1$ and is biased by a spring 5 in the direction opposite to the direction of attraction by the solenoid $S_1$, i.e. in the downward direction.

A support shaft 6 disposed at the lower portion of front side of the slide base 3 rotatably carries a bushing 8 which in turn is secured to the head base 7. The bushing 8 is prevented from coming off from the support shaft 6 by a ring (not shown) or the like means.

Magnetic heads $H_1$ and $H_2$ are supported, respectively, by head supports 9a and 9b which are provided on the front side of the head base 7. A limiting projection 10 is provided on the rear side of the head base 7 at a portion above the bushing 8, and extends to the rear side of the bed 1 through a clearance hole 3a formed in the slide base 3 and a clearance hole 1a formed in the bed 1. Therefore, the head base 7 is adapted to make a seesaw-like rocking motion around a fulcrum formed by the support shaft 6 within the range of left and rightward movement of the limiting projection in the clearance hole 3a.

Figure 2:
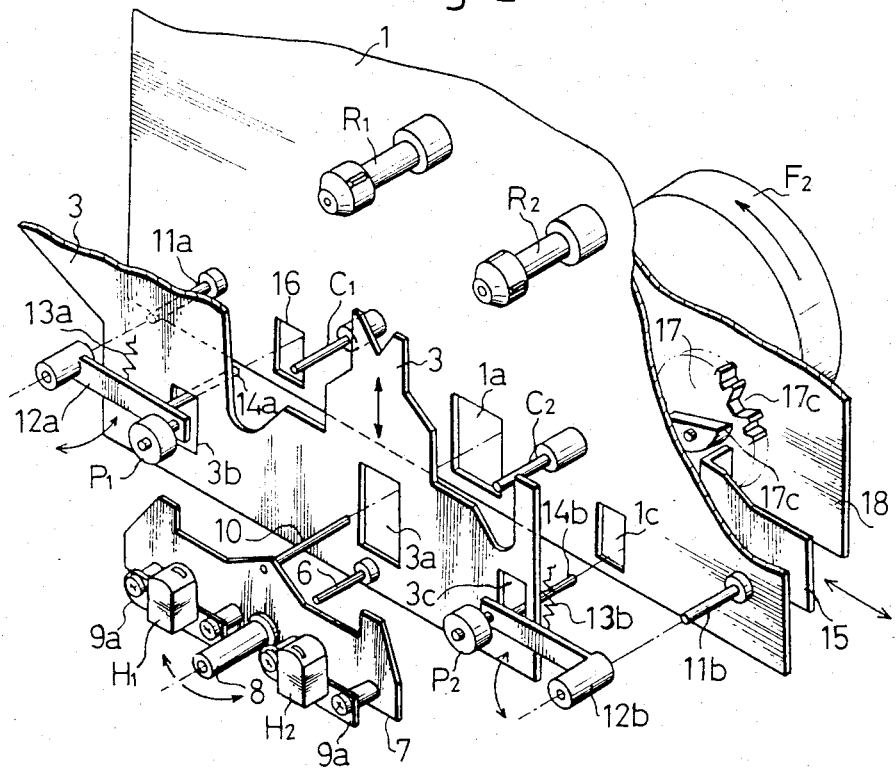
FIG. 2 is an exploded perspective view of an auto-reverse type cassette tape player in accordance with the embodiment of the invention.

A pair of roller support shafts 11a,11b are provided on the left and right sides of the bed 1. These roller support shafts 11a,11b loosely support roller brackets 12a,12b which in turn rotatably carry at their ends pinch rollers $P_1$, $P_2$. The roller brackets 12a,12b retain one ends of springs 13a,13b so as to be biased by the latter upwardly as viewed in FIG. 2.

Limiting pins 14a,14b are formed to project from the rear side of the roller brackets 12a,12b. Limiting pin 14a extends to the rear side of the bed 1 through a clearance hole 3b formed in the slide base 3 and a clearance hole 16 formed in the bed 1, while the limiting pin 14b also extends to the rear side of the bed 1 through a clearance hole 3c formed in the slide base 3 and a clearance hole 1c formed in the bed 1.

A slide plate 15 is secured to the rear side of the bed 1 and is slidable laterally. As will be seen from FIGS. 3 and 4, a leaf spring 16 fixed to the rear face of the slide plate 15 has both ends 16a,16b bent to oppose each other. The movement of the limiting projection 10 of the head base 7 is adapted to be limited by these ends 16a,16b. Also, the slide plate 15 is provided with a window 15a at a portion thereof corresponding to the ends 16a,16b of the leaf spring 16. An engaging slope 15b for actuating the limiting pin 14a of the roller bracket 12a is formed on the left end of the slide plate 15, while an engaging slope 15c for actuating the limiting pin 14b of the roller bracket 12b is formed on the right end of the slide plate 15. The right end of the slide plate 15 has also a notch 15d for actuating the slide plate 15 to the left and right. Both side portions of the notch 15d are bent rearwardly to form engaging walls 15e,15f facing each other.

Figure 5:
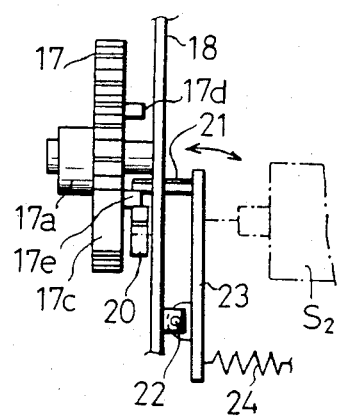
FIG. 5 is a view of the cassette tape player of FIG. 4 as viewed in the direction of arrow V.

A substantially semi-circular cam 17a formed unitarily with a drive gear 17 is disposed between the engaging walls 15e,15f. The drive gear 17 is rotatably carried by an intermediate base 18 (see FIGS. 2 and 3) interposed between the aforementioned bed 1 and the mounting base 2. Two non-toothed portions 17b and 17c are formed on the drive gear 17 as shown clearly in FIG. 6. The teeth of the gear 17 are positioned for meshing with a pinion 19 which is integrally attached to the aforementioned fly-wheel $F_2$. As will be seen from FIG. 5 which is a view in the direction of arrow V of FIG. 4 and also from FIG. 6 which is a rear side view of the construction shown in FIG. 4, a pair of streamlined projections 17d,17e are formed on the rear side of the drive gear 17. The leaf spring 20 fixed to the front side of the intermediate base 18 contacts one of the projections 17d,17e. In the drawings, the leaf spring 20 is illustrated as being in contact with the projection 17e. In consequence, the drive gear 17 is rotatively biased in the counter-clockwise direction of FIG. 6.

A stopper 21 formed of a plate-like member bent to have a <-shaped cross-section is disposed at the pressing side of the leaf spring 20. This stopper 21 is fixed to the end of a lever 23 which is rockable around a fulcrum 22 provided on the rear side of the intermediate base 18, and extends to the rear side of the drive gear 17 through an aperture (not shown) formed in the intermediate base 18. A solenoid $S_2$ (See FIG. 5) has a plunger connected to the upper end of the lever 23. A spring 24 is connected to the lower end of the lever 23.

The auto-reverse type cassette tape player of this embodiment having the construction heretofore described operates in a manner explained hereinbelow.

First of all, an explanation will be made as to a mechanism for laterally sliding the slide plate 15. The torque of the motor M is transmitted to the two fly-wheels $F_1$, $F_2$ by means of belts B, so that the fly-wheel F, and the associated capstan shaft $C_1$ rotate in the direction $\alpha$ while the other fly-wheel $F_2$ and the associated capstan shaft $C_2$ together with the pinion 19 rotate in the direction $\beta$ at respective constant speeds.

Figure 6:
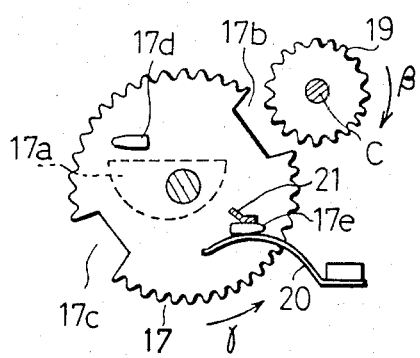
FIG. 6 is a rear elevational view of a driving gear.

In the state that the stopper 21 is kept in contact with the projection 17e of the drive gear 17 as shown in FIG. 6, the drive gear 17 is held stationary, so that the pinion gear 19 rotating in the direction $\beta$ idles in the non-toothed portion 17b of the drive gear 17.

For switching the running direction of the tape, a signal is delivered to the solenoid $S_2$ (FIG. 5) to make the latter attract its plunger, so that the lever 23 is actuated to bring the stopper 21 away from the projection 17e. In consequence, the projection 17e is rotated in the counter-clockwise direction of FIG. 6 as it is pressed by the leaf spring 20 and the drive gear 17 continues to rotate in this direction because its teeth are brought into meshing engagement with the pinion gear 19. Then, the solenoid $S_2$ is de-energized immediately so that the stopper 21 resumes the original state by the force of the spring 24 to permit the stopper 21 and the leaf spring 20 contact with each other. In this state, the pinion gear 19 idles when it is brought into the other non-toothed portion 17c of the drive gear 17.

Thus, the drive gear 17 makes an intermittent 180° rotation at each time the solenoid $S_2$ receives the signal. By this intermittent rotation of the drive gear 17, the cam 17a integral with this gear 17 is directed alternatingly in the direction shown in FIGS. 7a,7b and in the direction shown in FIG. 7c. This movement of the cam 17a is transmitted to the engaging walls 15e,15f of the slide plate 15 to produce a force to slide the slide plate 15 to the left or right. In consequence, when the projection 17e of the drive gear 17 is brought into contact with the stopper 21, i.e. in the state shown in FIG. 6, the slide plate 15 is stopped after sliding in the direction e as shown in FIGS. 7a and 7b, while, in the state in which the other projection 17d is brought in contact with the stopper 21, the slide plate 15 makes a stop after sliding in the direction $\phi$ as shown in FIG. 7c.

An explanation will be made hereinunder as to how the running direction of the tape is switched as a result of the sliding of the slide plate 15. When the play back operation is not made as in the case of loading and unloading of the cassette tape player with the micro-cassette tape T, the solenoid $S_1$ (See FIG. 1) is not energized so that the slide base 3 takes the lowered position due to the biasing force exerted by the spring 5.

In this state, the head base 7 attached to the slide base 3 also takes the lowered position, so that the magnetic heads $H_1$, $H_2$ are spaced away from the micro-cassette tape T. In this state, the end of the limiting projection 10 of the head base 7 is spaced downwardly from the window 15a slide plate 15 as shown in FIG. 7a.

On the other hand, the limiting pins 14a,14b of the roller brackets 12a,12b to which the pinch rollers $P_1,P_2$ are attached, are depressed downwardly by the upper edges of the clearance holes 3b, 3c (See FIG. 2) of the slide base 3, so that the pinch rollers $P_1$, $P_2$ attached to the roller brackets 12a, 12b are spaced from the capstan from the capstan shafts $C_1$, $C_2$. Meanwhile, the ends of the limiting pins 14a, 14b are positioned away from the engaging slopes 15b, 15c, as will be clearly seen from FIG. 7a.

For the playing back and recording operation after insertion of the micro-cassette tape T, the solenoid $S_1$ (FIG. 1) is energized and the slide base 3 is slid upwardly. Then, both of the limiting pins 14a,14b of the roller brackets 12a,12b, as well as the limiting projection 10 of the head base 7, are moved upward. In the meantime, provided that the slide plate 15 has been moved in the direction e as a result of the aforesaid operation of the drive gear 17, the upwardly moving limiting projection 10 comes into engagement with one end 16a of the leaf spring 16 secured to the slide plate 15, as shown in FIG. 7b, so that the limiting projection 10 is urged in the direction of the arrow W by the force of the lead spring 16. In consequence, the head base 7 is rotated in the direction of the arrow W (See FIG. 8) around the fulcrum constituted by the support shaft 6. In consequence, one $H_1$ of the magnetic head is brought into contact with the surface of the micro-cassette tape T, as shown in FIG. 1.

To the contrary, in the state shown in FIG. 7b the pin 14a lifted upward does not inter with the engaging slope 15b. Therefore, the roller bracket 12a is rotated by the force of the spring 13a (See FIG. 2) so that the pinch roller $P_1$ is made to contact the capstan shaft $C_1$ as shown in FIG. 1. Meanwhile, the other limiting pin 14b is stopped by the engaging slope 15c of the slide plate 15, so that the rotational position of the roller bracket 12b is restricted. Consequently, the pinch roller $P_2$ is positioned away from the capstan shaft $C_2$, as will be understood from FIG. 1. In this state, the tape is pinched between the capstan shaft $C_1$ and the pinch roller $P_1$, and is fed in the direction of the arrow Y (See FIG. 8) in accordance with the direction $\alpha$ of rotation of the capstan shaft $C_1$, so that recording and reproduction are made in and from the tracks at one side of the tape surface by means of the magnetic head $H_1$.

Then, as the slide plate 15 is switched in the direction as shown in FIG. 7c as a result of the operation of the drive gear 17, the limiting projection 10 is moved by one end 16b of the leaf spring 16 on the slide plate 15, in the direction opposite to the direction of movement performed in the state shown in FIG. 7b, i.e. in the direction of the arrow X. In consequence, the head base 7 is moved in the direction of the arrow X and the magnetic head $H_2$ comes into contact with the tape surface, while the magnetic head $H_1$ is moved away from the tape surface.

Furthermore, as shown in FIG. 7c, one 15b of the engaging slopes of the slide plate 15 stops one 14a of the limiting pins to depress the same downwardly as viewed in the drawing. Meanwhile, the other 15c of the engaging slopes is moved to a position where it does not stop the limiting pin 14b. In consequence, the roller bracket 12b adjacent to the limiting pin 14b is rotated by the force of the spring 13b, so that the pinch roller $P_1$ is moved into contact with the capstan shaft $C_2$. On the other hand, the pinch roller $P_1$ associated with the limiting pin 14a is moved away from the capstan shaft $C_1$. In this state, the tape is pinched between the pinch roller $P_2$ and the capstan shaft $C_2$, and is fed in the direction of arrow Z (FIG. 8) by the capstan shaft $C_2$ which rotates in the direction of $\beta$ together with the fly-wheel $F_2$, so that the recording and reproduction are made in and from the tracks at the different side of the tape surface from that used in the case of tape feed in the direction of arrow Y, by means of the magnetic head $H_2$.

It is to be noted that, when the direction of running of the tape is switched between the directions of arrows Y and Z, the direction of rotation of the reel shafts $R_1,R_2$ is also switched simultaneously with the switching operation of the head base 7 and the pinch rollers $P_1,P_2$.

Although the invention has been described through specific terms, the described embodiment is for the illustrating purpose only, and various changes and modifications may be imparted thereto without departing from the scope of the invention which is limited solely by the appended claims.

What is claimed is:

1. An auto-reverse type cassette tape player including:
    a bed carrying a pair of reel shafts and a pair of capstan shafts rotatable in opposite directions;
    a head base mounted on the front side of said bed by a support shaft in such a manner so as to be rockable around said support shaft;
    means for moving said head base into and out of a position along the path of movement of a tape;
    two magnetic heads carried by said head base at respective sides of said support shaft;
    a limiting projection mounted on said head base;
    slide means mounted on said bed and slidable in the direction generally parallel to the path of movement of a tape brought past either of said magnetic heads, the sliding direction of said slide means being switchable in accordance with a change in the tape feed direction;
    a driving member provided on said slide means and adapted to engage with said limiting projection to cause a rocking of said head base;
    said slide means having engaging slopes formed on respective sides of said support shaft;
    two pinch rollers carried on respective brackets rockably carried by said bed; and
    means carried by said brackets for engaging said slopes to bring said pinch rollers into selective engagement with a tape moving past respective magnetic heads.

2. An auto-reverse type cassette tape player according to claim 1, wherein said means for moving said head base includes a slide base mounted on said bed movably.

3. An auto-reverse type cassette tape player according to claim 2, wherein said support shaft is received by a bushing provided on said head base.

4. An auto-reverse type cassette tape player according to claim 2, wherein said slide base is adapted to be moved between a playing position and non-playing position in accordance with an energization and de-energization of a solenoid.

5. An auto-reverse type cassette tape player according to claim 1, including means for moving said slide means by rotation of a drive gear rotated intermittently.

6. An auto-reverse type cassette tape player according to claim 5, wherein said means for moving said slide means includes a drive gear having two non-toothed portions and a semi-circular cam, said semi-circular cam being engaged by said slide means.

7. An auto-reverse type cassette tape player according to claim 5, wherein tooth portions of said drive gear are adapted to engage a pinion gear carried by one of said capstan shafts.

8. A tape player for automatically reversing the direction of movement of a tape and bringing either of two magnetic heads selectively into engagement with said tape, comprising a bed carrying a pair of reel shafts and associated capstan shafts, means including a motor for rotating each reel shaft and its associated capstan shaft in a direction opposite that of the other reel shaft and associated capstan shaft, a slide base moveable generally perpendicular to the path of movement of said tape and carrying a head base pivotally on a front surface thereof, two magnetic heads carried on respective side portions of said head base a slide plate mounted for lateral movement on the rear surface of said slide base, means for sliding said slide plate in a first direction upon movement of said tape in one direction and sliding said slide plate in a second direction upon movement of said tape in the reverse direction, and means interconnecting said slide plate and said head base for pivoting one of said heads into engagement with the tape upon movement of said slide plate in its first direction and pivoting the other of said heads into engagement with said tape upon movement of said slide plate in its second direction.

9. A tape player according to claim 8, said motor being rotated unidirectionally for rotating said reel shafts and associated capstan shafts in their respective directions.

10. A tape player according to claim 8, including means including a solenoid for moving said slide base.

11. A tape player according to claim 8, said means for sliding said slide plate including a cam adapted to engage said slide plate and carried by a drive gear so that rotation of said drive gear in a single direction can slide said slide plate in its first and then its second position, and means for rotating said drive gear intermittently by motive power supplied from said motor.

12. A tape player according to claim 11, said drive gear having two segments of gear teeth on its periphery separated by non-toothed positions, said drive-gear rotating means including a pinion rotated by said motor and adapted to idle in said non-toothed portions, and means for selectively bringing said segments of gear teeth into engagement with said pinion when the direction of movement of the tape is to be changed.

* * * * *